United States Patent
Peskens et al.

(10) Patent No.: US 10,442,937 B2
(45) Date of Patent: Oct. 15, 2019

(54) INTUMESCENT COATING COMPOSITION

(71) Applicant: PPG Coatings Europe B.V., Amsterdam (NL)

(72) Inventors: Ronnie Peskens, Haarlem (NL); Thomas De Boer, Halfweg (NL)

(73) Assignee: PPG Coating Europe B.V., Amsterdam (NL)

(*) Notice: Subject to any disclaimer, the term of this patent is extended or adjusted under 35 U.S.C. 154(b) by 2 days.

(21) Appl. No.: 15/568,732

(22) PCT Filed: Apr. 22, 2016

(86) PCT No.: PCT/EP2016/059023
§ 371 (c)(1),
(2) Date: Oct. 23, 2017

(87) PCT Pub. No.: WO2016/170122
PCT Pub. Date: Oct. 27, 2016

(65) Prior Publication Data
US 2018/0079915 A1    Mar. 22, 2018

(30) Foreign Application Priority Data

Apr. 24, 2015  (EP) .................. 15165120

(51) Int. Cl.
*C09D 5/18* (2006.01)
*C08G 59/54* (2006.01)
*C08G 59/56* (2006.01)
*C09D 163/00* (2006.01)
*C09D 7/20* (2018.01)
*C09D 5/44* (2006.01)

(52) U.S. Cl.
CPC ............ *C09D 5/185* (2013.01); *C08G 59/54* (2013.01); *C08G 59/56* (2013.01); *C09D 5/4442* (2013.01); *C09D 7/20* (2018.01); *C09D 163/00* (2013.01); *C08G 2150/60* (2013.01)

(58) Field of Classification Search
CPC ........ C09D 163/00; C09D 5/185; C09D 7/20; C08G 59/00; C08G 59/50; C08G 59/60; C08G 59/44; C08G 59/46; C08G 59/54; C08G 59/56; C08L 63/00
See application file for complete search history.

(56) References Cited

U.S. PATENT DOCUMENTS

| 4,123,575 A * | 10/1978 | Wesch | C08K 5/0066 427/386 |
|---|---|---|---|
| 5,070,119 A * | 12/1991 | Nugent, Jr. | C08K 13/02 521/178 |
| 5,108,832 A | 4/1992 | Nugent, Jr. et al. | |
| 5,759,691 A * | 6/1998 | Scholz | C07F 9/409 428/413 |
| 6,489,405 B1 * | 12/2002 | Beisele | C08G 59/12 428/413 |
| 9,862,798 B2 * | 1/2018 | Zheng | C08G 59/60 |
| 2005/0179167 A1 | 8/2005 | Hachikian | |
| 2007/0072981 A1 | 3/2007 | Miller | |
| 2008/0166484 A1 * | 7/2008 | Smith | C08K 5/523 427/385.5 |
| 2011/0305907 A1 | 12/2011 | Scheuer | |
| 2013/0023605 A1 * | 1/2013 | Hoevel | C08K 3/36 523/466 |

FOREIGN PATENT DOCUMENTS

| CN | 102731968 | | 10/2012 | |
|---|---|---|---|---|
| DE | 19747553 A1 | * | 4/1999 | ........... C08G 59/304 |
| EP | 0166906 | | 1/1986 | |
| GB | 2071111 | | 9/1981 | |
| RU | 2370503 C2 | | 10/2009 | |
| WO | 00/55244 | | 9/2000 | |

OTHER PUBLICATIONS

Derwent Abstract of DE 19747553 (Acc. No. 1999-264953, 1999, 7 pages).*
Guojian Wang et al.: "Influences of Molecular Weight of Epoxy Binder on Fire Protection of Waterborne Intumescent Fire Resistive Coating", Surface and Coatings Technology, Elsevier, Amsterdam, NL, vol. 206, No. 8, Sep. 21, 2011 (Sep. 21, 2011), pp. 2146-2151, XP028357275.
Wang G. et al.: "Influences of Binder on Fire Protection and Anticorrosion Properties of Intumescent Fire Resistive Coating for Steel Structure", Surface and Coatings Technology, Elsevier, Amsterdam, NL, vol. 204, No. 8, Jan. 15, 2010 (Jan. 15, 2010), pp. 1186-1192, XP026788422.
English Abstract of CN102731968.
USSR Ministry for Installation and Special Construction Works, Central Bureau of Scientific and Technical Information, "Fire-hardened Polymeric Material—Series 'Special Construction Works'"; 1979; pp. 22-23; Issue 7; Express-Information; Moscow, Russian Federation.

* cited by examiner

Primary Examiner — Brieann R Johnston
(74) Attorney, Agent, or Firm — Lisa E. Geary, Esq.

(57) ABSTRACT

An intumescent coating composition that includes an epoxy resin binder, an epoxy reactive diluent, a curing agent and an acid catalyst. The curing agent includes a mixture of polyimide, polyetheramine, and an amine functional monomer, wherein the amine multifunctional monomer is different from the polyetheramine. The acid catalyst is effective to form a phosphoric acid on thermal decomposition. The coating composition has a viscosity of between 20,000 and 140,000 mPa/s at 20° C. and shear rate 1.5 $s^{-1}$ when measured within 1 minute of mixing the components. The invention also includes a coated substrate having the intumescent coating composition coated on at least a portion thereof.

15 Claims, No Drawings

INTUMESCENT COATING COMPOSITION

This application is a national stage entry of International Application PCT/EP2016/059023, filed Apr. 22, 2016, which claims priority to EP15165120.5, filed Apr. 24, 2015.

The present invention relates to an intumescent coating composition. In particular, the present invention relates to an intumescent coating composition suitable for deposition onto a substrate requiring improved cellulosic and hydrocarbon fire resistance, particularly onto a substrate utilised in the construction industry.

Intumescent materials are substances that expand on exposure to heat, producing a char. This volume expansion and charring protects any underlying substrate as the char acts as a poor conductor of heat. Accordingly, intumescent coatings are used in passive fire protection and applied to substrates as fire retardant coatings to improve fire resistance. Such coatings are useful to provide retardant barriers in many construction applications, for example in steel and/or concrete structures. Improved fire resistance is provided as a result of reduction to the rate of heating, hence prolonging the time for the building materials to reach critical failure temperature.

A wide variety of intumescent coating compositions have been developed for passive fire protection. The coating compositions need to have certain properties such as being capable of simple high speed application, demonstrating fast and extensive expansion and having excellent durability, flexibility and properties suitable for their end use.

Intumescent coating compositions known in the art such as those disclosed in U.S. Pat. No. 5,070,119 are known to include sources of zinc and boron. Such compositions, although capable of providing protection against hydrocarbon fires, are not suitable for cellulosic fires. In general, cellulosic fires (involving carbonaceous materials such as wood and paper) have a relatively slow heat increase, whereas hydrocarbon fires (involving oil or gas, for example) reach a high temperature very quickly. These different characteristics mean that an intumescent coating is required to have different properties, depending on the type of fire that it is protecting against.

Many of the epoxy based intumescent coating compositions currently used as fire retardant barriers demonstrate a limited expansion factor and due to their high viscosity, necessitate considerable heating on application at ambient temperature.

Therefore, there is a desire to provide an intumescent coating composition with both enhanced fire retardant properties and a simple, high speed, improved application system, suitable for protection against both cellulosic and hydrocarbon fires.

According to a first aspect of the present invention there is provided an intumescent coating composition comprising:
an epoxy resin binder,
an epoxy reactive diluent,
a curing agent, and
an acid catalyst
wherein the curing agent is comprised of a mixture of polyamide, polyetheramine and an amine multifunctional monomer and wherein the acid catalyst is effective to form a phosphoric acid on thermal decomposition, and wherein the coating composition has a viscosity of between 20,000 and 140,000 mPa/s at 20° C. and shear rate 1.5 $s^{-1}$.

It has been surprisingly and advantageously found that the intumescent coating composition of the present invention intumesces at a relatively low temperature and expands quickly to form a dense char. The char layer has a higher expansion factor than intumescent coating compositions known in the art and exhibits improved flexibility and durability, reducing the level of cracking observed in the carbon insulating layer when subjected to extreme variations in temperature over a short period of time.

The intumescent coating composition according to the present invention advantageously provides a thermoset coating that additionally demonstrates the thermoplastic properties of softening and melting. Accordingly, the intumescent coating composition may be used to provide resistance against both cellulosic and hydrocarbon fires.

Still further, the presence of both the epoxy reactive diluent and curing agent according to the present invention has been surprisingly and advantageously found to enable the production of a flexible resin system that demonstrates a lower viscosity at ambient temperature than previous compositions and an appropriate melt viscosity during a cellulosic fire curve.

The epoxy resin binder according to the present invention may be produced by any suitable method. The epoxy resin binder may comprise one or more epoxy resins. Such 'epoxy resins' may include (homo)polymers and copolymers derived from combinations of compounds comprising at least one epoxide functionality such as glycidol with cyclic co-reactants, suitably aromatic co-reactants comprising at least two hydroxyl groups such as Bisphenol A. As used herein, the terms "epoxy" and "epoxide" are used interchangeably. Examples of suitable compounds comprising at least one epoxide functionality include, but are not limited to one or more of the following: glycidol; epichlorohydrin; glycidol amines or mixtures thereof. Examples of suitable cyclic co-reactants, suitably aromatic co-reactants include, but are not limited to one or more of the following: Bisphenol A; Bisphenol F; novolac resins such as phenolic novolac and cresol novolac or mixtures thereof.

The epoxy resin binder may comprise commercially available epoxy resin materials. In certain embodiments, the epoxide resin binder may comprise Bisphenol diglycidyl ether epoxide resins, such as Bisphenol A diglycidyl ether and/or Bisphenol F diglycidyl ether epoxide resins. In another embodiment, the epoxy resin binder may comprise an epoxy phenolic novolac and/or an epoxy cresol novolac resin. In a further embodiment, the epoxide resin binder may comprise one or more of the following: Bisphenol A diglycidyl ether epoxide resin; Bisphenol F diglycidyl ether epoxide resin; epoxy phenolic novolac resin; epoxy cresol novolac resin or mixtures thereof. Suitable epoxy resin binders according to the present invention can include one or more of the following: Eponex 1510; Eponex 1513 (hydrogenated bisphenol A-epichlorohydrin epoxy resin) commercially available from Shell Chemical; Santolink LSE-120 commercially available from Monsanto; Epodil 757 (cyclohexane dimethanol diglycidylether) commercially available from Pacific Anchor; Araldite XUGY358 and PY327 commercially available from Ciba Geigy; Araldite GY 2600, GY 281 and EPN 1138 commercially available from Huntsman; Epikote 828 commercially available from Silmid and Epikote 862 commercially available from EVRoberts; Epirez commercially available from Rhone-Poulenc; Arofiint 393 and 607 commercially available from Reichold and ERL4221 commercially available from Union Carbide. Other suitable non-aromatic epoxy resins may include EP 4080E (cycloaliphatic epoxy resin) commercially available from Adeka; DER 732, 736, 330 and 331 commercially available from Dow Chemical Company.

Suitably, the epoxy resin binder comprises a Bisphenol diglycidyl ether epoxide resin.

The epoxy resin binder may have any suitable weight-average molecular weight (Mw). In certain embodiments, the epoxy resin binder may have an Mw from about 100 to 8000 Daltons (Da=g/mole), suitably from about 100 to 1000 Da, or even from about 150 to 500 Da.

The epoxy resin binder may have any suitable number-average molecular weight (Mn). In certain embodiments, the epoxy resin may have an Mn from about 100 to 5000 Daltons (Da=g/mole), suitably from about 100 to 1000 Da, or even from about 150 to 500 Da.

The weight-average molecular weight may be measured by any suitable method. Techniques to measure the weight-average molecular weight will be well known to a person skilled in the art. The Mw values and ranges given herein are as determined by gel permeation chromatography using a polystyrene standard according to ASTM D6579-11 ("Standard Practice for Molecular Weight Averages and Molecular Weight Distribution of Hydrocarbon, Rosin and Terpene Resins by Size Exclusion Chromatography". UV detector: 254 nm, solvent: unstabilised THF, retention time marker: toluene, sample concentration: 2 mg/ml).

A person skilled in the art will appreciate that methods used for measuring the weight-average molecular weight may also be used to measure the number-average molecular weight.

The epoxy resin binder may have any suitable glass transition temperature (Tg). In certain embodiments, the epoxy resin binder may have a Tg from about −50 to 80° C., suitably from about −40 to 40° C., or even from about −30 to 20° C.

The Tg of the epoxy resin binder may be measured by any suitable method. Methods to measure Tg will be well known to a person skilled in the art. Suitably, the Tg is measured according to ASTM D6604-00(2013) ("Standard Practice for Glass Transition Temperatures of Hydrocarbon Resins by Differential Scanning calorimetry". Heat-flux differential scanning calorimetry (DSC), sample pans: aluminium, reference: blank, calibration: indium and mercury, sample weight: 10 mg, heating rate: 20° C./min).

The epoxy resin binder may have any suitable hydroxyl value. In certain embodiments, the epoxy resin binder may have a hydroxyl value of up to 150 mg KOH/g, suitably up to 175 mg KOH/g, or even up to 200 mg KOH/g.

The epoxy resin binder may have any suitable epoxy equivalent weight. In certain embodiments, the epoxy resin binder may have an epoxy equivalent weight from about 100 to 3000 g/mol, suitably from about 100 to 1000 g/mol, or even from about 100 to 250 g/mol.

The epoxy resin binder may be present in the intumescent coating composition in any suitable amount. In certain embodiments, the coating composition may comprise from about 1 to 60 wt %, such as from about 5 to 50 wt %, or even from about 10 to 30 wt % of the epoxy resin binder based on the total solid weight of the intumescent coating composition. Suitably, the intumescent coating composition may comprise about 15 to 20 wt % of the epoxy resin binder based on the total solid weight of the intumescent coating composition. In embodiments in which the epoxy resin binder comprises a mixture of epoxy resin binder materials, the above amounts refer to the total amount of all such compounds present in the intumescent coating composition.

The intumescent coating composition of the present invention comprises an epoxy reactive diluent. Suitably, the epoxy reactive diluent is operable to lower the viscosity of the composition. Suitable epoxy reactive diluents may be produced by any suitable method. Such epoxy reactive diluents may be formed from the reaction of a compound comprising at least one aliphatic epoxide functionality such as diglycidyl ether with an aliphatic alcohol or polyol. Examples of suitable compounds comprising at least one epoxide functionality include, but are not limited to one or more of the following: monoglycidyl ether; diglycidyl ether; triglycidyl ether and mixtures thereof. Examples of suitable alcohols and polyols include, but are not limited to one or more of the following: hexanediol; butanediol; glycerol; trimethylolpropane; trimethylolethane; pentaerythritol; neopentyl glycol and mixtures thereof.

In certain embodiments, the epoxy reactive diluent comprises a diglycidyl ether of an aliphatic alcohol. Suitably, the epoxy reactive diluent comprises a diglycidyl ether of hexanediol and/or a diglycidyl ether of neopentyl glycol.

The epoxy reactive diluent may comprise commercially available epoxy reactive materials. Suitable commercially available epoxy reactive materials according to the present invention can include one or more of the following: Araldite CY 179 commercially available from Huntsman; Araldite DY-A (an aliphatic monofunctional epoxy reactive diluent—2-ethylhexyl glycidyl ether), DY-D (an aliphatic difunctional epoxy reactive diluent—1,4 butanediol diglycidyl ether), DY-H (an aliphatic difunctional epoxy reactive diluent—1,6 hexanediol diglycidyl ether), DY-T (an aliphatic trifunctional epoxy reactive diluent—trimethylolpropane triglycidyl ether) commercially available from Huntsman and Epodil 749 (an aliphatic difunctional epoxy reactive diluent—neopentyl glycol diglycidyl ether) commercially available from Air Products.

Suitably, the epoxy resin diluent comprises Araldite DY-D and/or Araldite DY-H and/or Epodil 749.

The epoxy reactive diluent may be present in the intumescent coating composition of the present invention in any suitable amount. In certain embodiments, the coating composition may comprise about 1 to 30 wt %, such as from about 2 to 20 wt %, or even from about 3 to 15 wt % of the epoxy reactive diluent based on the total solid weight of the intumescent coating composition. Suitably, the intumescent coating composition may comprise about 5 to 10 wt % of the epoxy reactive diluent based on the total solid weight of the coating composition.

In certain embodiments, the weight ratio of epoxy resin binder:epoxy reactive diluent may range from 0.05:1 to 4:1, such as from 1:1 to 3:1, for example, 2:1 to 3:1.

The curing agent according to the present invention comprises a combination of polyamide, polyetheramine and an amine multifunctional monomer suitable for curing the epoxy resin binder.

Suitable polyamides may be produced by any suitable method. Such polyamides may include (homo)polymers or copolymers derived from combinations of polyamines and dicarboxylic acids. Examples of suitable polyamines include, but are not limited to one or more of the following: hexamethylenediamine; ethylenediamine; diethylenetriamine; triethylenetetramine; tetraethylenepentamine; isophoronediamine or mixtures thereof. Examples of suitable dicarboxylic acids (or anhydride or ester derivatives) include, but are not limited to one or more of the following: adipic acid; decanedioic acid or mixtures thereof. Dicarboxylic acids can also be used in the form of cyclic anhydrides of dicarboxylic acids, examples include maleic anhydride; sulfonic anhydride; phthalic anhydride or mixtures thereof. Dicarboxylic acids can also be used in the form of the di-ester materials such as diethyl malonate; dimethyl malonate or mixtures thereof.

Suitably, the dicarboxylic acids are in the form of dimerised fatty acids. Examples of suitable dimerised fatty acids include, but are not limited to one or more of the following: dimer of stearic acid; dimer of palmitic acid; dimer of lauric acid or combinations/mixtures thereof.

In certain embodiments, the polyamide may be a polyamidoimidazoline. Suitable polyamidoimidazolines may be formed by any suitable method. For example, such polyamidoimidazolines may include (homo)polymers or copolymers derived from combinations of polyamines and dicarboxylic acids. Examples of suitable polyamines include, but are not limited to one or more of the following: ethylenediamine; diethylenetriamine; triethylenetetramine; tetraethylenepentamine or mixtures thereof. Examples of suitable dicarboxylic acids include, but are not limited to: dimerised fatty acids; adipic acid and combinations thereof.

The polyamide of the curing agent may comprise commercially available polyamide materials. In certain embodiments, suitable commercially available polyamide materials can include, but are not limited to one or more of the following: Versamid 115, 125, 140 and 150 commercially available from BASF; Aradur 115 and 125 commercially available from Huntsman; Aradur 140 (polyamidoimidazoline) commercially available from Huntsman; Aradur 955, 9130, 9140 and 3376 commercially available from Huntsman.

Suitably, the polyamide material comprises a polyamidoimidazoline. Suitably the polyamide material comprises Versamid 125, Versamid 140, Versamid 150 and/or Aradur 140. Most suitably, Versamid 140 and/or Aradur 140.

The polyamide may have any suitable weight-average molecular weight (Mw). In certain embodiments, the polyamide of the curing agent may have an Mw from about 100 to 5000 Daltons (Da=g/mole), suitably from about 100 to 2000 Da, or even from about 100 to 1000 Da.

The polyamide may have any suitable number-average molecular weight (Mn). In certain embodiments, the polyamide may have an Mn from about 100 to 3000 Daltons (Da=g/mole), suitably from about 100 to 2000 Da, or even from about 100 to 1000 Da.

The weight-average molecular weight may be measured by any suitable method. Techniques to measure the weight-average molecular weight will be well known to a person skilled in the art. The Mw values and ranges given herein are as determined by gel permeation chromatography using a polystyrene standard according to ASTM D6579-11 ("Standard Practice for Molecular Weight Averages and Molecular Weight Distribution of Hydrocarbon, Rosin and Terpene Resins by Size Exclusion Chromatography". UV detector: 254 nm, solvent: unstabilised THF, retention time marker: toluene, sample concentration: 2 mg/ml).

A person skilled in the art will appreciate that methods used for measuring the weight-average molecular weight may also be used to measure the number-average molecular weight.

The polyamide may have any suitable glass transition temperature (Tg). In certain embodiments, the polyamide may have a Tg from about −50 to 50° C., suitably from about −30 to 30° C., or even from about −20 to 20° C.

The Tg of the polyamide of the curing agent according to the present invention may be measured by any suitable method. Methods to measure Tg will be well known to a person skilled in the art. Suitably, the Tg is measured according to ASTM D6604-00(2013) ("Standard Practice for Glass Transition Temperatures of Hydrocarbon Resins by Differential Scanning calorimtry". Heat-flux differential scanning calorimetry (DSC), sample pans: aluminium, reference: blank, calibration: indium and mercury, sample weight: 10 mg, heating rate: 20° C./min).

The curing agent of the present invention may comprise any suitable polyetheramine suitable for curing the epoxy resin binder. Suitable polyetheramines may be produced by any suitable method. Suitably, the polyetheramines comprise a polyether backbone based on suitable compounds comprising an epoxide functionality including but not limited to one or more of the following: propylene oxide (PO), ethylene oxide (EO) or a mixture thereof. Suitably, the polyether backbone is selected from polypropylene glycol and/or polyethylene glycol. The terminal hydroxyl groups of the polyether backbone are suitably aminated to form the corresponding polyetheramine.

The polyetheramine of the curing agent may comprise commercially available polyetheramine materials. In certain embodiments, commercially available polyetheramine materials include, but are not limited to the following: Jeffamine D-230, D-400, D-2000 and T-403 commercially available from Huntsman.

Suitably, the polyetheramine comprises Jeffamine D-230.

The polyetheramine may have any suitable weight-average molecular weight (Mw). In certain embodiments, the polyetheramine of the curing agent may have an Mw from about 200 to 7000 Daltons (Da=g/mole), suitably from about 200 to 2500 Da, or even from about 200 to 500 Da.

The polyetheramine may have any suitable number-average molecular weight (Mn). In certain embodiments, the polyetheramine may have an Mn from about 200 to 5000 Daltons (Da=g/mole), suitably 200 to 2500 Da, or even from about 200 to 500 Da.

The weight-average molecular weight may be measured by any suitable method. Techniques to measure the weight-average molecular weight will be well known to a person skilled in the art. The Mw values and ranges given herein are as determined by gel permeation chromatography using a polystyrene standard according to ASTM D6579-11 ("Standard Practice for Molecular Weight Averages and Molecular Weight Distribution of Hydrocarbon, Rosin and Terpene Resins by Size Exclusion Chromatography". UV detector: 254 nm, solvent: unstabilised THF, retention time marker: toluene, sample concentration: 2 mg/ml).

A person skilled in the art will appreciate that methods used for measuring the weight-average molecular weight may also be used to measure the number-average molecular weight.

The polyetheramine may have any suitable glass transition temperature (Tg). In certain embodiments, the polyetheramine may have a Tg from about −50 to 50° C., suitably from about −40 to 30° C., or even from about −40 to 20° C.

The Tg of the polyetheramine of the curing agent according to the present invention may be measured by any suitable method. Methods to measure Tg will be well known to a person skilled in the art. Suitably, the Tg is measured according to ASTM D6604-00(2013) ("Standard Practice for Glass Transition Temperatures of Hydrocarbon Resins by Differential Scanning calorimtry". Heat-flux differential scanning calorimetry (DSC), sample pans: aluminium, reference: blank, calibration: indium and mercury, sample weight: 10 mg, heating rate: 20° C./min).

The curing agent of the coating composition may comprise any suitable amine multifunctional monomer. Suitably, the amine multifunctional monomer comprises a polyamine. Suitable examples of multifunctional monomers include polyamines such as isophoronediamine; metaxylenediamine; diethylenetriamine (DETA); triethylenetetramine (TETA); tetraethylenepentamine (TEPA) and combinations thereof.

The polyamide may be present in the coating composition in any suitable amount. In certain embodiments, the coating composition may comprise from about 1 to 15 wt %, such as from about 2 to 10 wt %, or even from about 3 to 10 wt % of the polyamide based on the total solid weight of the intumescent coating composition. Suitably, the coating composition may comprise about 3 to 8 wt % of the polyamide based on the total solid weight of the intumescent coating composition.

The polyetheramine may be present in the coating composition in any suitable amount. In certain embodiments, the coating composition may comprise from about 0.1 to 10 wt %, such as from about 0.25 to 8 wt %, or even from about 0.5 to 4 wt % of the polyetheramine based on the total solid weight of the intumescent coating composition. Suitably, the coating composition may comprise about 1 to 3 wt % of the polyetheramine based on the total solid weight of the intumescent coating composition.

The amine multifunctional monomer may be present in the coating composition in any suitable amount. In certain embodiments, the coating composition may comprise from about 0.1 to 10 wt %, such as from about 0.25 to 5 wt %, or even from about 0.5 to 4 wt % of the amine multifunctional monomer based on the total solid weight of the intumescent coating composition. Suitably, the coating composition may comprise about 1 to 3 wt % of the amine multifunctional monomer based on the total solid weight of the intumescent coating composition.

The curing agent according to the present invention may comprise any suitable weight ratio of polyamide:polyetheramine:amine multifunctional monomer. In certain embodiments, the weight ratio of polyamide:polyetheramine:amine multifunctional monomer may range from about 40 to 80:5 to 50:1 to 50, such as 40 to 70:15 to 35:15 to 35, for example, 60 to 70:15 to 25:15 to 25.

Suitably, the intumescent coating composition may further comprise a carbon donor. Suitable carbon donors will be well known to a person skilled in the art. According to one embodiment, such a carbon donor may be in the form of one or more polyhydric alcohols (polyols), such as pentaerythritol or a derivative thereof, effective to form a phosphoric acid ester on contact with a phosphoric acid source. Examples of suitable carbon donors may be selected from organic polyhydroxyl compounds, such as pentaerythritol; dipentaerythritol; tripentaerythritol; cellulose; starch and sugars. Suitably, the carbon donor is pentaerythiritol. The carbon donor may be present in the coating composition in any suitable amount. In certain embodiments, the coating composition may comprise from about 0 to 20 wt %, such as 5 to 15 wt %, suitably from about 8 to 12 wt % of the carbon donor based on the total solid weight of the intumescent coating composition.

The coating composition according to the present invention further comprises an acid catalyst, wherein the acid catalyst is effective to form a phosphoric acid, preferably a polyphosphoric acid on thermal decomposition. Suitable catalysts will be well known to the person skilled in the art. Such acid catalysts suitably thermally decompose upon exposure to extreme heat such as that found in a fire, for example above 200° C. It will be appreciated that the phosphoric acid formed under such conditions is then available to react with the carbon donor, suitably forming a phosphoric acid ester upon contact therewith at such temperatures. In one embodiment, suitable acid catalysts can include phosphoric acid esters of polyhydroxyl compounds (partial phosphate esters) and/or aminophosphates such as ammonium and/or amine phosphates. Particularly suitable phosphates are aminophosphates such as ammonium phosphate and/or melamine phosphate, suitably ammonium polyphosphate. However, the skilled person will be aware of many variations of the nitrogen containing acidic phosphorus compounds which are used in the art of intumescent coatings. In certain embodiments, inorganic compounds such as zinc borate and/or ammonium pentaborate may act as acid catalysts. The acid catalyst may be present in the coating composition in any suitable amount. In certain embodiments, the coating composition may comprise from about 10 to 50 wt %, suitably from about 20 to 35 wt % of the acid catalyst based on the total solid weight of the intumescent coating composition, such as 25 to 35 wt %.

The intumescent coating composition may further comprise an expandable intumescent material (blowing agent). The blowing agent is typically effective to form a char by emission of an inert gas. Suitable blowing agents will be well known to those skilled in the art. Suitable blowing agents preferably decompose to provide inert gas at temperatures above 200° C., for example in the range 250 to 390° C. Suitable examples of commercially available blowing agents include but are not restricted to nitrogen containing compounds such as: melamine; melamine salts and derivatives; urea; dicyandiamide; guanidine or mixtures thereof. Suitably, the blowing agent comprises melamine. The blowing agent may be present in the coating composition in any suitable amount. In certain embodiments, the coating composition may comprise from about 3 to 20 wt %, suitably from about 4 to 17 wt %, such as from about 5 to 15 wt % of the blowing agent based on the total solid weight of the intumescent coating composition.

In certain embodiments, the coating composition may further comprise fibrous materials suitable for reinforcement of the char. Such fibrous materials may include organic, glass or mineral. The fibrous material may be present in the coating composition in any suitable amount. In certain embodiments, the coating composition may comprise from about 0.5 to 10 wt %, suitably for about 1 to 8 wt % of the fibrous material based on the total solid weight of the intumescent coating composition. The fibrous material may be present in the coating composition measuring any suitable length. In certain embodiments, the fibrous material has a length of up to 1000 microns.

The intumescent coating composition according to the present invention may further contain an additive or combination of additives. Suitable additives will be well known to the person skilled in the art. Examples of suitable additives include, but are not limited to the following: plasticisers; pigments; defoamers; thixotropic agents; biocides; fragrances; fillers; adhesion agents; additional intumescent and fire-stop agents; buffers; dispersing agents; surfactants; deaerators; surface control additives; hydrophobing agents; wetting additives; rheological agents; anti-cratering additives; radiation curing additives; anti-corrosion additives; pH regulators; anti-graffiti additives or combinations thereof.

Suitable rheology modifiers (rheological agents) will be well known to the person skilled in the art. Suitable examples of rheology modifiers include, but are not limited to the following: fumed silica; bentonite clay; castor oils and derivatives thereof; micronized amide wax or combinations thereof. In certain embodiments the rheology modifier, when present, may be used in the coating composition in amounts of at least 0.01 wt % based on the total solid weight of the intumescent coating composition.

Suitable pigments will be well known to the person skilled in the art. Suitable pigments may be, for example, titanium dioxide and/or carbon black. The pigment, when present, may be used in the coating composition in any suitable amount. In certain embodiments, the pigment, when present, may be used in the coating composition in amounts of up to about 90 wt %, such as up to about 50 wt %, or even up to about 15 wt % based on the total solid weight of the intumescent coating composition. In some embodiments, the pigment may be present in an amount of between 3 to 20 wt %, such as 5 to 15 wt %.

Plasticisers may optionally be added to the coating composition in order to increase flexibility. Suitable plasticisers will be well known to the person skilled in the art. Suitable plasticisers include, but are not limited to the following: aromatic alcohols such as benzyl alcohol and nonyl phenol; phosphate esters such as isopropylated triaryl phosphate ester or combinations thereof. The plasticiser, when present, may be present in amounts from about 1 to 10 wt % based on the total solid weight of the intumescent coating composition.

Suitably, the coating composition may comprise a pigment volume concentration of between 30 to 70 wt %, such as between 40 to 60 wt %, for example 45 to 55 wt %. The "pigment volume concentration" refers to the volume of solid content in the total coating composition. This value excludes the epoxy resin binder, the epoxy reactive diluent, the curing agent, any plasticiser and any castor oil derivative or amide wax present in the intumescent coating composition.

It has been surprisingly and advantageously found that the intumescent coating composition of the present invention requires no additional solvent and yet still has a relatively low viscosity to aid ease of application, requiring no line heater during application at ambient temperature.

Suitably, the coating composition of the present invention contains no additional solvent. In certain embodiments, the solid content of the coating composition is at least 85 wt %, such as up to 90 wt %, or even up to 95 wt % based on the total weight of the coating composition. In one embodiment, the solid content of the coating composition may be above 99 wt %, such as up to 100 wt %.

The intumescent coating composition according to the present invention has a viscosity of between 20,000 and 140,000 mPa/s at 20° C. and shear rate 1.5 s$^{-1}$, suitably measured according to ASTM D2196-10. In certain embodiments, the coating composition may have a viscosity from about 25,000 to 125,000 mPa/s at 20° C. and shear rate 1.5 s$^{-1}$, suitably from about 30,000 to 110,000 mPa/s, such as from about 35,000 to 95,000 mPa/s. Suitably, the intumescent coating composition may have a viscosity from about 40,000 to 80,000 mPa/s at 20° C. and shear rate 1.5 s$^{-1}$.

The viscosity is measured within 5 minutes, such as within 2 minutes or even within 1.5 minutes of initial mixing of the components of the intumescent coating composition. Suitably, the viscosity is measured within 1 minute of the initial mixing of the components of the intumescent coating composition Methods to measure viscosity will be well known to a person skilled in the art. Suitably, the viscosity is measured using Brookfield RV spindle s7 at 6 rpm and shear rate 1.5 s$^{-1}$, according to ASTM D2196-10 ("Standard Test Methods for Rheological Properties of Non-Newtonian Materials by Rotational (Brookfield type) Viscometer".

Suitably, the intumescent coating composition according to the present invention intumesces at a temperature of 300° C. or less, suitably 250° C. or less, or even 200° C. or less.

Suitably, the intumescent coating composition swells at least 10 times (1000%), preferably at least 20 times (2000%) of its original thickness in less than 20 minutes when heated according to the EN1363-1 (ISO 834) fire test. The temperature in the furnace after 10 minutes of this test is approximately 678° C. and after 30 minutes it is approximately 842° C.

As used herein, the singular includes the plural and plural encompasses singular, unless specifically stated otherwise. For example, the use of the singular, i.e. "a" or "an", includes "one or more". In addition, as used herein, the use of "or" means "and/or" unless specifically stated otherwise, even though "and/or" may be explicitly used in certain instances.

The intumescent coating composition may be applied to any suitable substrate. Examples of suitable substrates include but are not limited to steel and/or concrete construction units such as beams; hollow beams; cellular beams; columns and hollow columns. The intumescent coating compositions of the present invention are particularly advantageous in that they can be applied to a variety of substrates, particularly steel and/or concrete substrates and suitably, steel substrates.

The coating composition according to the present invention may be applied to the substrate by any suitable method. Methods of applying said coating composition will be well known to the person skilled in the art. Suitable application methods include, but are not limited to the following: spray coating, roll coating, dipping, casting and/or painting. Suitably, all or part of the surface may be covered.

In certain embodiments, the intumescent composition may be applied at ambient temperature using an electric or pneumatic single or twin feed airless application system. Suitably, the pressure at the application nozzle is at least 20 MPa. In another embodiment, the coating composition is applied using a modified airless system with a line heater when the surrounding temperature is 15° C. or less. The line heater enables the coating compositions to be heated to temperatures of up to 60° C.

The coating composition may be applied to a substrate as a single layer or as part of a multi-layer system. In certain embodiments, the coating composition may be applied on top of a primer or as the primer layer itself. The coating composition may form a top coat layer. The coating composition may be applied to a substrate once or multiple times.

The intumescent coating composition may be applied to a substrate to any suitable dry film thickness. In certain embodiments, the coating composition may be applied to a dry film thickness from about 10 μm (microns) to 5 cm, suitably as from about 100 μm to 4 cm, such as from about 120 μm to 3 cm, or even from about 140 μm to 2.5 cm. In certain embodiments, the coating compositions may be applied to a dry film thickness from about 150 μm to 2 cm, suitably from about 200 μm to 1.5 cm.

In certain embodiments, the coating composition is in the form of two component compositions having a first component composition and a second component composition. These first and second component compositions are suitably contacted together before application to the substrate. In one embodiment, the first component composition comprises the epoxy resin binder and the second component composition comprises the curing agent. In another embodiment, the first component composition comprises the epoxy resin binder and/or the epoxy reactive diluent and the second component composition comprises the curing agent. Both first and second component compositions comprise additional components, typically selected to minimise reactivity within each composition component. The fibrous materials may be added to either the first or second component compositions.

In certain embodiments, the intumescent coating composition of the present invention may be cured by a heat curing process. Suitably, the coating composition may be cured at a temperature from about 5 to 60° C., such as about 20 to 25° C. Suitably, the coating compositions are heat cured for a period of time from about 10 to 30 hours.

According to a second aspect of the present invention there is provided a coated article, coated on at least a portion thereof with an intumescent coating composition, the intumescent coating composition comprising:
    an epoxy resin binder,
    an epoxy reactive diluent,
    a curing agent, and
    an acid catalyst
wherein the curing agent is comprised of a mixture of polyamide, polyetheramine and an amine multifunctional monomer and wherein the acid catalyst is effective to form a phosphoric acid on thermal decomposition, and wherein the coating composition has a viscosity of between 20,000 and 140,000 mPa/s at 20° C. and shear rate 1.5 s$^{-1}$.

According to a third aspect of the present invention there is provided a steel or concrete substrate coated on at least a portion thereof with an intumescent coating composition, the intumescent coating composition comprising:
    an epoxy resin binder,
    an epoxy reactive diluent,
    a curing agent, and
    an acid catalyst
wherein the curing agent is comprised of a mixture of polyamide, polyetheramine and an amine multifunctional monomer and wherein the acid catalyst is effective to form a phosphoric acid on thermal decomposition, and wherein the coating composition has a viscosity of between 20,000 and 140,000 mPa/s at 20° C. and shear rate 1.5 s$^{-1}$.

According to a further aspect of the present invention there is provided a method of increasing the passive fire protection of a substrate, comprising applying an intumescent coating composition thereto, the intumescent coating composition comprising:
    an epoxy resin binder,
    an epoxy reactive diluent,
    a curing agent, and
    an acid catalyst
wherein the curing agent is comprised of a mixture of polyamide, polyetheramine and an amine multifunctional monomer and wherein the acid catalyst is effective to form a phosphoric acid on thermal decomposition, and wherein the coating composition has a viscosity of between 20,000 and 140,000 mPa/s at 20° C. and shear rate 1.5 s$^{-1}$.

All of the features contained herein may be combined with any of the above aspects and in any combination.

For a better understanding of the invention and to show how embodiments of the same may be carried into effect, reference will now be made, by way of example, to the following experimental data.

EXAMPLES

Coating Compositions

Coating compositions 1 and 2 and comparative coating composition 1 were prepared from two component compositions. Both component compositions were produced using a dispermat-type high speed dissolver. The solid materials were introduced into the liquid materials whilst stirring at low speed and subsequently grinded at high speed at 45° C. until the fineness of the ground pigment was below 120 μm (microns). Grind fineness was measured using a Hegmann-type grindometer. Prior to application, the two component compositions were mixed until homogeneous.

Coating compositions 1 and 2 and comparative coating composition 1 were prepared according to the formulations in Table 1. All amounts are given in parts by weight (pbw).

TABLE 1

Formulations of Coating Compositions

|  | Coating Composition 1 | Coating Composition 2 | Comparative Coating Composition 1 |  |
| --- | --- | --- | --- | --- |
| FIRST COMPONENT COMPOSITION | | | | |
| Bisphenol A-type diglycidyl ether | 18.29 | 16.25 | 23.04 | Epoxy resin binder |
| 1,6-Hexanediol diglycidyl ether | 7.17 | | | Epoxy reactive diluent |
| Neopentyl glycol diglycidyl ether | | 7.04 | | Epoxy reactive diluent |
| Micronised amide wax | 0.34 | 0.27 | 0.29 | Rheology modifier |
| Castor oil derivative | 0.17 | 0.13 | 0.14 | Rheology modifier |
| Titanium dioxide | 10.55 | 13.54 | 10.15 | Pigment |
| Pentaerythritol | 9.63 | 10.02 | 6.18 | Carbon donor |
| Ammonium polyphosphate | 29.88 | 28.16 | 28.75 | Acid catalyst |
| Benzyl alcohol | 5.15 | 5.65 | 5.52 | Plasticiser |
| SECOND COMPONENT COMPOSITION | | | | |
| Polyamide AEW 95 | 4.70 | 5.99 | 11.29 | Curing agent |
| Polyetheramine AEW 57 | 2.02 | 2.71 | | Curing agent |

TABLE 1-continued

Formulations of Coating Compositions

|  | Coating Composition 1 | Coating Composition 2 | Comparative Coating Composition 1 | |
|---|---|---|---|---|
| Isophoronediamine | 2.43 | 1.02 |  | Curing agent |
| Fumed silica | 0.19 | 0.37 | 0.10 | Rheology modifier |
| Bentonite clay | 0.02 | 0.05 | 0.01 | Rheology modifier |
| Melamine | 9.46 | 8.80 | 9.20 | Blowing agent |
| Pentaerythritol |  |  | 3.87 | Carbon donor |
| Benzyl alcohol |  |  | 1.46 | Plasticiser |

The properties of the coating compositions were tested via the following methods. Results are shown in Table 2.

Preparation of Test Substrates:

Coatings were applied to 150×75×3 mm steel panels at 8 mm dry film thickness and cured for 1 week at ambient conditions and a further week at 40° C. The samples were burnt with a propane torch for 3 minutes from a distance of 15 cm.

The coating compositions were tested for char density, char cracking, char shrinking and char adhesion. Viscosity, gel-time and expansion factor of the coating compositions were also measured according to the procedures below.

Viscosity:

Viscosity was evaluated according to ASTM D2196-10 using Brookfield RV spindles s7 at 6 rpm and shear rate 1.5 s$^{-1}$. Viscosity was measured within 1 minute of initial mixing of the components at 20° C.

Gel-Time:

Gel-time refers to the time taken for the initial viscosity to increase by 100%. Gel-time was evaluated according to ASTM D2196-10 using Brookfield RV spindles s7 at 6 rpm and shear rate 1.5 s$^{-1}$.

Expansion Factor:

The expansion factor of the coating compositions was calculated using the following formula:

$$\frac{\text{Char height after torch test}}{\text{Initial dry film thickness}}$$

Char Density:

Char density was evaluated according to the quantity and size of air pockets throughout the char and using a rating of 1 to 5, with 5 being the best.

Char Cracking:

Char cracking was evaluated according to the quantity and extent of cracking to appear on the surface of the coating and using a rating of 1 to 5, with 5 being the best.

Char Shrinking:

Char shrinking was evaluated according to the level of shrinking of the char from the edges of the panel in the horizontal plane and using a rating of 1 to 5, with 5 being the best.

Char Adhesion:

The char adhesion of the coating composition was evaluated according to the level of peeling from the panel and using a rating of 1 to 5, with 5 being the best.

The results are shown in Table 2, below.

TABLE 2

Test Results

|  | Coating Composition 1 | Coating Composition 2 | Comparative Coating Composition 1 |
|---|---|---|---|
| Viscosity (mPa/s) | 67,000 | 31,000 | >150,000 |
| Gel-time (min) | 110 | 77 | 280 |
| Expansion factor | 13 | 17 | 9 |
| Char density | 5 | 4 | 4 |
| Char cracking | 4 | 3 | 3 |
| Char Shrinking | 4 | 3 | 2 |
| Char Adhesion | 4 | 3 | 3 |

The results demonstrate that the intumescent coating compositions according to the present invention have lower viscosity, shorter gel times allowing for faster drying and improved char expansion factor and physical properties than coatings known in the art.

Attention is directed to all papers and documents which are filed concurrently with or previous to this specification in connection with this application and which are open to the public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, expect combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract or drawings), or to any novel one, or any novel combination, of the steps of any method or process so disclosed.

The invention claimed is:

1. An intumescent coating composition comprising:
an epoxy resin binder,
an epoxy reactive diluent,
a curing agent, and
an acid catalyst,
wherein the curing agent is comprised of a mixture of polyamide, polyetheramine, and an amine multifunctional monomer, wherein the amine multifunctional monomer is different from the polyetheramine, and
wherein the acid catalyst is effective to form a phosphoric acid on thermal decomposition, and
wherein the coating composition has a viscosity of between 20,000 and 140,000 mPa/s at 20° C. and shear rate 1.5 s$^{-1}$ when measured within 1 minute of initial mixing.

2. An intumescent coating composition according to claim 1, wherein the epoxy resin binder comprises a Bisphenol diglycidyl ether epoxide resin.

3. An intumescent coating composition according to claim 1, wherein the epoxy reactive diluent comprises a diglycidyl ether of an aliphatic alcohol.

4. An intumescent coating composition according to claim 1, wherein the polyamide of the curing agent comprises a polyamidoimidazoline.

5. An intumescent coating composition according to claim 1, wherein the polyetheramine of the curing agent comprises a polyether backbone selected from polypropylene glycol and/or polyethylene glycol.

6. An intumescent coating composition according to claim 1, wherein the amine multifunctional monomer of the curing agent comprises a polyamine.

7. An intumescent coating composition according to claim 1, wherein the coating composition comprises from 1 to 60 wt % of the epoxy resin binder based on the total solid weight of the coating composition.

8. An intumescent coating composition according to claim 1, wherein the coating composition comprises from 1 to 30 wt % of the epoxy reactive diluent based on the total solid weight of the coating composition.

9. An intumescent coating composition according to claim 1, wherein the coating composition comprises from 1 to 15 wt % of polyamide based on the total solid weight of the composition.

10. An intumescent coating composition according to claim 1, wherein the coating composition comprises from 0.1 to 10 wt % of polyetheramine based on the total solid weight of the coating composition.

11. An intumescent coating composition according to claim 1, wherein the coating composition comprises from about 0.1 to 10 wt % of amine multifunctional monomer based on the total solid weight of the coating composition.

12. An intumescent coating composition according to claim 1, wherein the coating composition is formed from two component compositions, wherein the first component composition comprises the epoxy resin binder and the second component composition comprises the curing agent.

13. A coated substrate, coated on at least a portion thereof with an intumescent coating composition, the intumescent coating composition comprising:
an epoxy resin binder,
an epoxy reactive diluent,
a curing agent, and
an acid catalyst,
wherein the curing agent is comprised of a mixture of polyamide, polyetheramine and an amine multifunctional monomer, wherein the amine multifunctional monomer is different from the polyetheramine, and
wherein the acid catalyst is effective to form a phosphoric acid on thermal decomposition, and wherein the coating composition has a viscosity of between 20,000 and 140,000 mPa/s at 20° C. and shear rate 1.5 s$^{-1}$ when measured within 1 minute of initial mixing.

14. A steel or concrete substrate coated on at least a portion thereof with an intumescent coating composition, the intumescent coating composition comprising:
an epoxy resin binder,
an epoxy reactive diluent,
a curing agent, and
an acid catalyst,
wherein the curing agent is comprised of a mixture of polyamide, polyetheramine and an amine multifunctional monomer, wherein the amine multifunctional monomer is different from the polyetheramine, and
wherein the acid catalyst is effective to form a phosphoric acid on thermal decomposition, and wherein the coating composition has a viscosity of between 20,000 and 140,000 mPa/s at 20° C. and shear rate 1.5 s$^{-1}$ when measured within 1 minute of initial mixing.

15. A method of increasing the passive fire protection of a substrate, comprising applying an intumescent coating composition thereto, the intumescent coating composition comprising:
an epoxy resin binder,
an epoxy reactive diluent,
a curing agent, and
an acid catalyst,
wherein the curing agent is comprised of a mixture of polyamide, polyetheramine and an amine multifunctional monomer, wherein the amine multifunctional monomer is different from the polyetheramine, and
wherein the acid catalyst is effective to form a phosphoric acid on thermal decomposition, and wherein the coating composition has a viscosity of between 20,000 and 140,000 mPa/s at 20° C. and shear rate 1.5 s$^{-1}$ when measured within 1 minute of initial mixing.

* * * * *